Patented Apr. 2, 1940

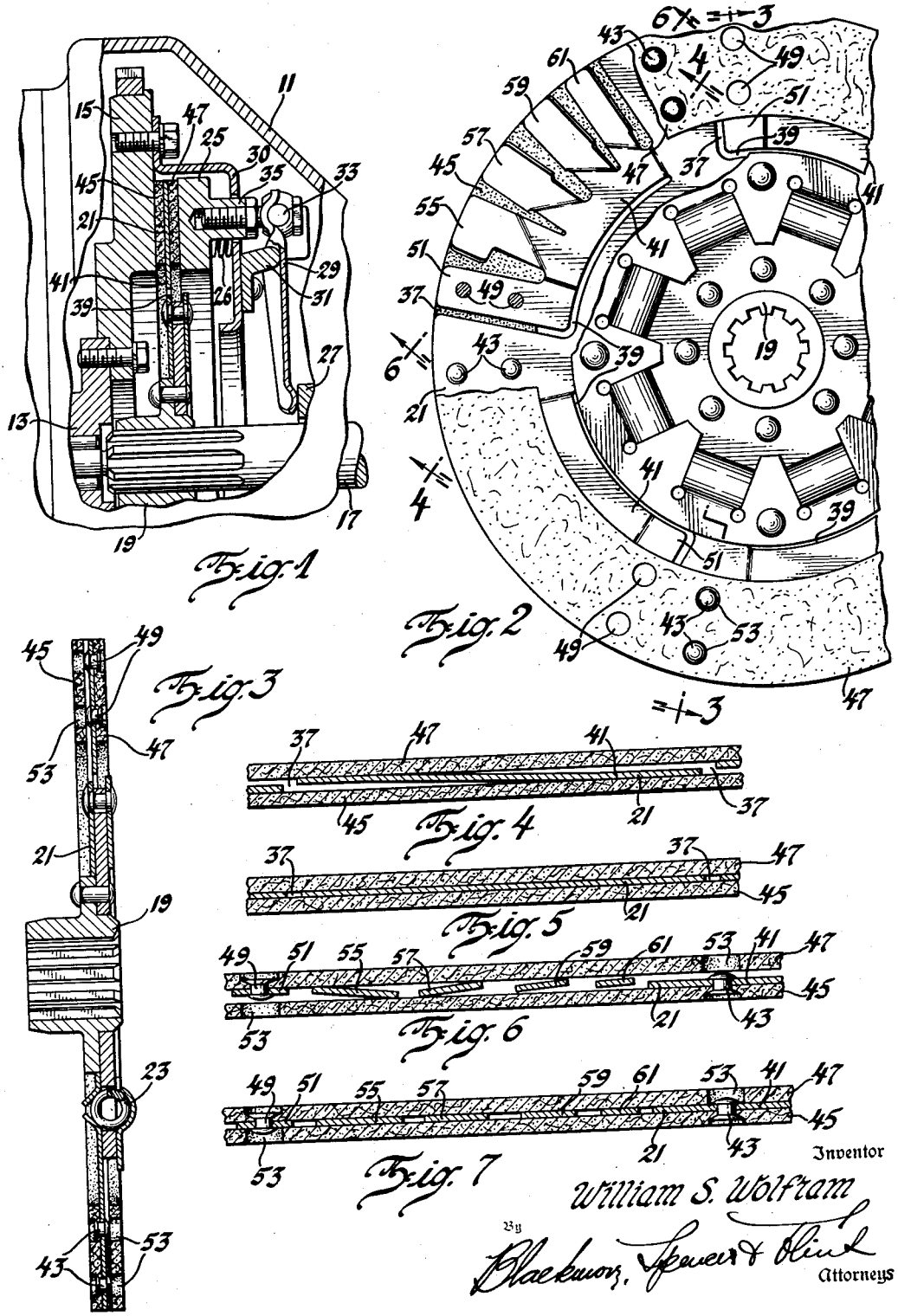

2,195,665

UNITED STATES PATENT OFFICE 2,195,665

FRICTION CLUTCH

William S. Wolfram, Dayton, Ohio, assignor to General Motors Corporation, Detroit, Mich., a corporation of Delaware Application February 27, 1939, Serial No. 258,647

2 Claims. (Cl. 192—107)

This invention relates to friction clutches such as are used to releasably couple the engine shaft of a motor vehicle to the input shaft of the transmission. In such a clutch the engine shaft carries a flywheel and between it and a so-called pressure plate which rotates with the flywheel there is gripped a driven plate carried by the transmission shaft. The present invention is concerned with an improved form of driven plate in such an assembly.

An object of the invention is to produce a driven plate having axially resilient parts to insure smooth engagement when the pressure plate is moved toward the flywheel. Other objects such as efficiency in operation and simplicity and economy in production are sought to be obtained by the novel structure hereinafter described.

The invention is shown on the accompanying drawing wherein:

Figure 1 is a transverse section through a part of the clutch enclosed in the usual housing.

Figure 2 is a view in elevation, partly broken away.

Figure 3 is a section on line 3—3 of Figure 2.

Figure 4 is a section on line 4—4 of Figure 2.

Figure 5 is a section corresponding to Figure 4 but having the parts displaced from the relation shown in Figure 4.

Figure 6 is a section on line 6—6 of Figure 2.

Figure 7 is a section like that of Figure 6 but having the parts displaced from the positions they occupy in Figure 6.

On the drawing, numeral 11 represents a housing for the clutch. Entering the housing at one end is an engine shaft 13 carrying a flywheel 15. Entering the housing from the opposite end is a driven shaft 17, this being the input shaft of the transmission. Driven shaft 17 carries for rotation therewith a hub 19. A driven plate designated as a whole by numeral 21 is connected to the hub by coil springs 23 which transmit the torque between plate 21 and hub 19. This spring arrangement requires no specific description inasmuch as no novelty is claimed for it. The pressure plate 25 is adapted to be moved toward the flywheel and to grip the driven plate by any preferred form of clutch engaging spring 26. The pressure plate is withdrawn from the flywheel by the use of a sleeve 27 concentric with shaft 17. The sleeve is adapted to be moved toward the left, Figure 1, by any convenient instrumentality such as the usual clutch throwout lever. The movement of the sleeve is transmited through levers or fingers 29 which fingers are fulcrumed to a clutch cover 30 at 31. Rotation of the fingers operate to withdraw the pressure plate 25, the fingers being connected to pressure plate lugs 35 by suitable connections designated as a whole by numeral 33.

The invention resides in the details of the driven plate. This plate has a plurality of radial slots marked 37 from the inner ends of each of which is a circumferential slot 39 whereby the marginal wall of the plate is provided with a plurality of circumferentially extending tongues 41. To the root of each tongue, rivets 43 secure a friction facing 45 on one side—the flywheel side—of the driven plate. A second facing 47 is secured to the pressure plate side of the driven plate and is attached thereto by rivets 49 extending through the tips 51 of the circumferential tongues. Each facing has apertures as at 53 to provide access to the rivets which secure the other facing.

From Figure 3 it will be seen that the root portion of each tongue lies in the plane of the plate but that the tips of the tongues are deflected from that plane toward the pressure plate. This result is obtained by bending the tongue circumferentially as perhaps best shown by Figure 4. Obviously when the pressure plate is in clutch engaging position this bend is flattened and, in the act of being flattened, it offers resilient resistance to the main clutch engaging spring. It thus insures a gradual engagement of the clutch members and prevents the grabby action which results from a sudden gripping of the driven plate when the main spring is permitted to push the pressure plate toward the flywheel. To further cushion the action of the main clutch spring, each circumferential tongue is formed with several radial slots extending from the marginal edge inwardly and partly across the tongue. These slots form secondary tongues marked 55, 57, 59 and 61. The secondary tongues are twisted along radial lines so that one radial edge of each tongue lies adjacent one facing and its other radial edge lies adjacent the other facing. If desired the twist may be in the same direction in each tongue although I prefer to reversely twist one or more of these secondary tongues. It will be seen that the direction of twist given secondary tongue 55 is opposite to that given the others. Also, and in order to introduce the resilient resistance of the tongues successively, one or more may be twisted sufficiently to space the facings to an extent greater than the twists of the other tongues are capable of spacing them. It will be seen that the tongues 55 and 57 are spreading the facings and in contact with both while the tongues 59 and 61 have clearances between their edges and the facings, the clearances of tongue 61 being greater than those of tongue 59. In this way the resilient resistance comes into operation in successive steps.

It may be added that although the segmental tongues are shown as integral parts of the driven plate they might, if desired, be made as separate segments and secured as by riveting to the driven plate.

By the construction described above, the objects of the invention hereinbefore set forth are accomplished by a structure which is both efficient and comparatively inexpensive.

I claim:

1. In a clutch, a driven plate, said plate having a plurality of marginal circumferentially extending tongues, the root and tip of each tongue being axially spaced, opposite facings secured to said plate, one facing secured to the roots of the tongues and the other secured to the tips of the tongues, each of said tongues having a plurality of radial slots extending from the outer margin and part way across the tongues forming secondary radially extending tongues, each secondary tongue being twisted along a radial line so that its marginal edges lie adjacent opposite facings.

2. In a clutch, a driven plate, said plate having a plurality of marginal circumferentially extending tongues, the root and tip of each tongue being axially spaced, opposite facings secured to said plate, one facing secured to the roots of the tongues and the other secured to the tips of the tongues, each of said tongues having a plurality of radial slots extending from the outer margin and part way across the tongues forming secondary radially extending tongues, each secondary tongue being twisted along a radial line so that its marginal edges lie adjacent opposite facings, the extent of twisting being greater in the case of certain tongues than in the case of others to produce a step by step resilient resistance to the flattening of the plate.

WILLIAM S. WOLFRAM.